United States Patent [19]

Scheuermann et al.

[11] 3,904,678

[45] Sept. 9, 1975

[54] OPTICAL BRIGHTENERS CONTAINING SULFONIC ACID GROUPS OF THE BIS-STYRYLBENZENE SERIES

[75] Inventors: Horst Scheuermann, Ludwigshafen; Peter-Matthias Hell, Frankenthal; Gottfried Burkhardt, Ludwigshafen, all of Germany

[73] Assignee: Badische Anilin- & Soda-Fabrik Aktiengesellschaft, Ludwigshafen (Rhine), Germany

[22] Filed: May 4, 1970

[21] Appl. No.: 34,622

[30] Foreign Application Priority Data

May 7, 1969 Germany.............................. 1923267

[52] U.S. Cl..................... 260/505 R; 8/1 W; 8/89; 260/611 A
[51] Int. Cl.².................................. C07C 143/24

[58] Field of Search..................... 260/505 R, 507 A

[56] References Cited

UNITED STATES PATENTS 2,527,425 10/1950 Keller et al. ........................ 260/505
2,547,910 4/1951 Hausermann et al.............. 260/507

OTHER PUBLICATIONS

"Organic Chemistry," Morrison et al., 2nd ed. (1966), pp. 870, 871.

*Primary Examiner*—Bernard Helfin
*Assistant Examiner*—A. Siegel
*Attorney, Agent, or Firm*—Johnston, Keil, Thompson & Shurtleff

[57] ABSTRACT

Bis-styrylbenzene compounds having sulfonic acid groups which are useful as optical brighteners, especially for natural and synthetic polyamides and cotton.

6 Claims, No Drawings

OPTICAL BRIGHTENERS CONTAINING SULFONIC ACID GROUPS OF THE BIS-STYRYLBENZENE SERIES

The invention relates to new compounds having the general formula (I):

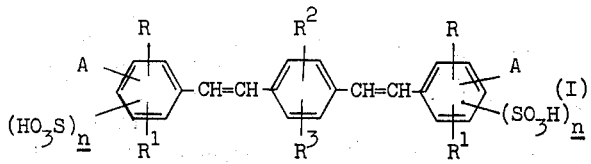

where
A denotes hydrogen, chlorine or methyl;
R denotes hydrogen, chlorine or bromine or alkyl or alkoxy having one to eight carbon atoms;
$R^1$ denotes hydrogen, chlorine or methyl, methoxy or ethoxy;
$R^2$ and $R^3$ denote hydrogen, chlorine, methyl or methoxy; and
$n$ denotes one of the integers 1 and 2,
at least three substituents other than hydrogen being present in the molecule.

Examples of alkyl groups having one to eight carbon atoms are methyl, ethyl, n-propyl, isopropyl, n-butyl, isobutyl, t-butyl, n-hexyl and n-octyl. Examples of appropriate alkoxy groups are methoxy, ethoxy, butoxy and octoxy.

In one group of compounds having the general formula:

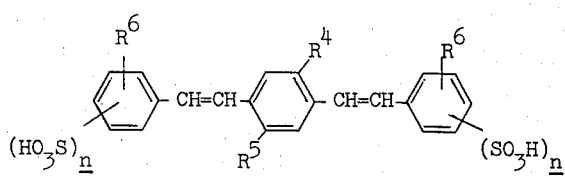

which is of particular industrial importance, $R^4$ and $R^5$ denote hydrogen or methyl and $R^6$ denotes hydrogen when $n = 2$ or chlorine, alkyl having one to four carbon atoms or methoxy or ethoxy when $n = 1$. The new compounds are colorless to pale yellow substances which are completely soluble in water. They may be used for example in the form of free acids or preferably as alkali metal salts or ammonium salts.

They are outstandingly suitable for the optical brightening of wool, silk, synthetic polyamides such as nylon 6 or nylon 6,6 or compounds having an analogous chemical constitution and particularly cotton. The oustanding degree of whiteness and the brilliance and high color strength which can be achieved with the new compounds are to be emphasized. Moreover good light fastness properties are achieved.

For the production of the new compounds, for example a compound having the general formula (II):

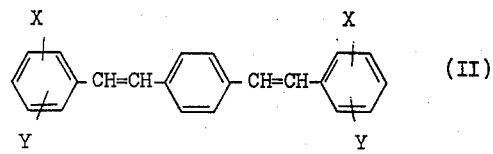

where X denotes chlorine, alkyl or alkoxy and Y denotes hydrogen, alkyl or alkoxy, may be sulfonated with concentrated sulfuric acid or oleum.

The new compounds may be prepared more advantageously by sulfonating an aldehyde having the general formula (III):

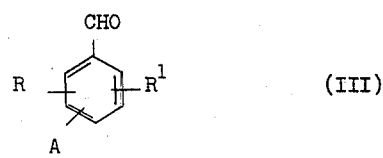

where A, R and $R^1$ have the meanings given above, with concentrated sulfuric acid or oleum and the reaction products in the form of alkali metal salts are treated in a Wittig reaction (for example according to the process of German Patent No. 1,108,219) with a compound having the general formula (IV):

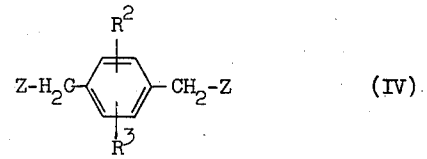

where $R^2$ and $R^3$ having the meanings given above and Z denotes chlorine or bromine.

The compounds having the formula (IV) are first converted into an organo-phosphorus compound suitable for the Wittig reaction.

When mixtures of aldehydes having the formula (III) are reacted with compounds having the formula (IV) mixtures of compounds having the formula (I) are obtained some of which have unsymmetrical substitution.

The invention is illustrated by the following Examples.

Parts and percentages are by weight unless otherwise specified.

EXAMPLE 1

54 parts of 30% sodium methylate solution in methanol is slowly added while stirring at 30° to 40°C to a mixture of 38 parts of tetraethyl p-xylylenediphosponate, 49 parts of the sodium salt of 4-methylbenzaldehyde-3-sulfonic acid and 250 parts of dimethylformamide. The whole is then heated at 60° to 70°C for 3 hours and stirred overnight at room temperature. The reaction mixture is poured into 1,500 parts of acetone and the precipitate suction filtered and heated at 80° to 100°C in 250 parts of 18% aqueous common salt solution while stirring and then cooled to room temperature. The crude product is suction filtered and recrystallized from a mixture (1 : 1) of dimethylformamide and water. 35 parts (68% of the theory) of the disodium salt of 1,4-bis-(4-methylstyryl)-benzene-3',3''-disulfonic acid is obtained in the form of colorless to pale yellow crystals. Fluorescence spectrum: $\lambda_{max} = 425$ millimicrons, measured in dimethylformamide. The compound has the formula

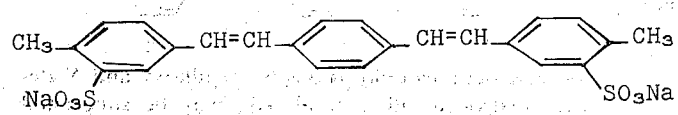

The sodium salt of 4-methylbenzaldehyde-3-sulfonic acid required as starting compound may be prepared as follows:

96 parts of p-methylbenzaldehyde is gradually added to 480 parts of 25% oleum while stirring, the temperature being kept below 30°C. The solution is stirred for 3 hours at 80° to 90°C, cooled and poured onto 2,000 parts of ice. The reaction product is separated by salting out with common salt, suction filtered and stirred with 800 parts of saturated common salt solution at 80° to 100°C. After having been cooled to room temperature, the product is suction filtered again and dried under subatmospheric pressure at 50° to 60°C. 179 parts of sulfonate is obtained having a content of common salt of 29.5%; this is equivalent to 71% of the theory.

EXAMPLE 2

54 parts of a 30% solution of sodium methylate in methanol is allowed to flow slowly at 30° to 40°C while stirring into a mixture of 38 parts of tetraethyl p-xylylenediphosphonate, 54 parts of the sodium salt of 4-methoxybenzaldehyde-3-sulfonic acid and 300 parts of dimethylformamide. The whole is then stirred for 3 hours at 60° to 70°C and then overnight at room temperature. The reaction mixture is poured into 1,500 parts of acetone, the precipitate is suction filtered and stirred with 300 parts of 18% aqueous common salt at 80° to 100°C and then cooled to room temperature. The reaction product is suction filtered and dried at subatmospheric pressure at 50° to 60°C. 46 parts of the disodium salt of 1,4-bis-(4-methoxystyryl)-benzene-3'-3''-disulfonic acid is obtained in the form of a pale yellow powder containing 21.5% of common salt. This is equivalent to 66% of the theory. Fluorescence spectrum: $\lambda_{max} = 435$ millimicrons, measured in dimethylformamide.

The compound has the formula:

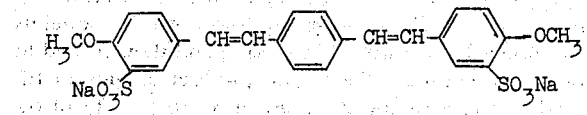

The sodium salt of 4-methoxybenzaldehyde-3-sulfonic acid required as starting compound may be prepared as follows:

109 parts of p-methoxybenzaldehyde is gradually added to 450 parts of 5% oleum while stirring, the temperature of the mixture being kept below 10°C. The whole is then heated up within an hour to 90° to 95°C and after another 2 hours 45 parts of 24% oleum is added. The mixture is further stirred for four and a half hours at 90° to 95°C and then cooled to room temperature. The solution is poured onto 2,000 parts of ice and the product salted out by adding common salt. The whole is suction filtered and the crystal pulp issuspended in 600 parts of saturated aqueous common salt solution and heated at 80° to 100°C while stirring. The reaction product is suction filtered at room temperature and dried at subatmospheric pressure at 50° to 60°C. 172 parts of sulfonate having a common salt content of 26.5% is obtained. This is equivalent to 66.5 % of the theory.

EXAMPLE 3

76 parts of tetraethyl p-xylylenediphosphonate is dissolved in 1,000 parts of dimethylformamide and 117 parts of the disodium salt of benzaldehyde-2,4-disulfonic acid is added. Then while stirring at 30° to 40°C, 180 parts of a 30% solution of sodium methylate in methanol is allowed to flow in slowly. The whole is heated for 5 hours at 50° to 60°C and stirred overnight at room temperature. The mixture is poured into 2,500 parts of acetone and the precipitate is suction filtered and dissolved in 500 parts of water. A pH of 3 to 4 is set up with sulfuric acid, insoluble matter is suction filtered and 2,500 parts of ethanol is added to the filtrate. The crystal pulp which separates is dissolved hot in 400 parts of 90% aqueous dimethylformamide, insoluble matter is filtered off and isopropanol is added to the filtrate. After isolation, 62 parts (45% of the theory) of the tetrasodium salt of 1,4-bis-styrylbenzene-2',2'',4',4''-tetrasulfonic acid is obtained. Fluorescence spectrum: $\lambda_{max} = 432$ millimicrons, measured in dimethylformamide. The tetrasodium salt has the formula:

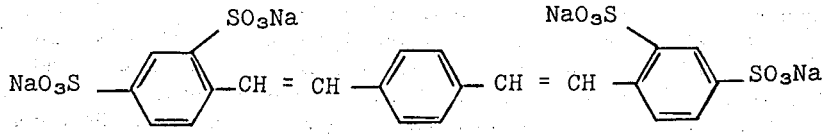

EXAMPLE 4

As described in Example 1, 42 parts of tetraethyl p-xylylenediphosphonate is reacted with 60 parts of the sodium salt of 2-methoxybenzaldehyde-5-sulfonic acid. The crude product obtained is dissolved in 400 parts of 80% aqueous dimethylformamide with heating and the insoluble matter is filtered off. The sulfonate is precipitated from the filtrate with isopropanol. 35 parts (58% of the theory) of the disodium salt of 1,4-bis-(2-methoxystyryl)-benzene-5',5''-disulfonic acid is obtained in the form of yellow crystals. Fluorescence spectrum: $\lambda_{max} = 438$ and 416 millimicrons, measured in dimethylformamide. The disodium salt has the formula:

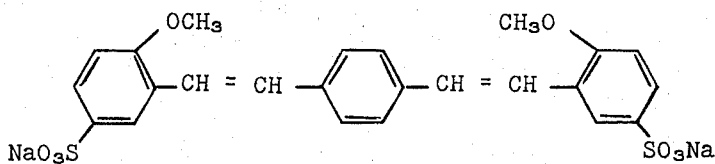

EXAMPLE 5

42 parts of tetraethyl p-xylylenediphosphonate is reacted with 67 parts of the sodium salt of 2,4-dimethoxybenzaldehyde-5-sulfonic acid according to Example 1. The crude product is dissolved for purification in 600 parts of 70% aqueous dimethylformamide insoluble matter is filtered off, and the sulfonate is precipitated with ethanol. 39 parts (59% of the theory) of the disodium salt of 1,4-bis-(2,4-dimethoxystyryl)-benzene-5',5''-disulfonic acid is obtained in the form of luminescent yellow crystals. Fluorescence spectrum: $\lambda_{max}$ = 462 millimicrons, measured in dimethylformamide. The disodium salt has the formula

EXAMPLE 7

42 parts of tetraethyl p-xylylenediphosphonate is condensed with 61 parts of the sodium salt of 4-chlorobenzaldehyde-2-sulfonic acid as described in Example 1. The crude product is dissolved while heating in 400 parts of 80% aqueous dimethylformamide, insoluble matter is filtered off and the product is precipitated with isopropanol. 36 parts (59% of the theory) of the disodium salt of 1,4-bis-(4-chlorostyryl)-benzene-2',2''-disulfonic acid is obtained in the form of pale yellow crystals. Fluorescence spectrum: $\lambda_{max}$ = 429 millimicrons, measured in dimethylformamide. The disodium salt has the formula:

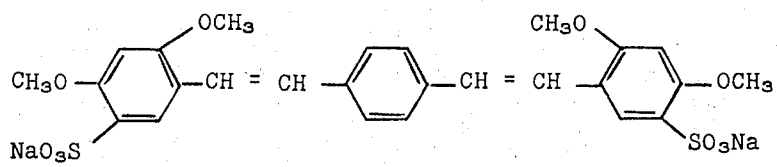

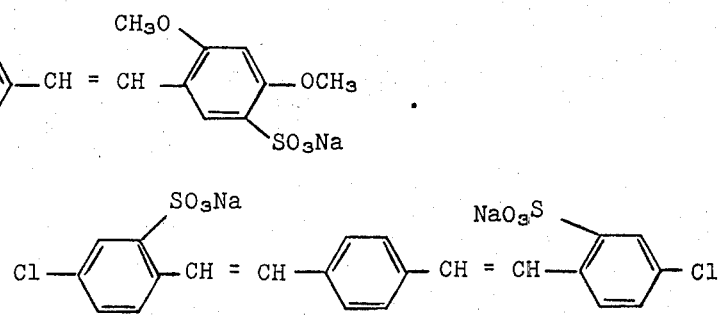

EXAMPLE 6

42 parts of tetraethyl p-xylylenediphosphonate is condensed with 61 parts of the sodium salt of 2-chlorobenzaldehyde-5-sulfonic acid in the manner described in Example 1. The crude product is dissolved for further purification in 300 parts of hot 80% aqueous dimethylformamide and insoluble matter is filtered off. After precipitation with isopropanol, 28 parts (46% of the theory) of the disodium salt of 1,4-bis-(2-chlorostyryl)-benzene-5',5''-disulfonic acid is obtained as a yellow powder. Fluorescence spectrum. $\lambda_{max}$ = 445 and 434 millimicrons, measured in dimethylformamide. The disodium salt has the formula:

EXAMPLE 8

26.5 parts of tetraethyl p-xylylenediphosphonate and 37.5 parts of the sodium salt of 2,4-dimethylbenzaldehyde-5-sulfonic acid are reacted as described in Example 1. The crude product is dissolved in 400 parts of dimethylformamide while heating and insoluble matter is filtered off. After precipitation with acetone, 23 parts (61% of the theory) of the disodium salt of 1,4-bis-(2,4-dimethylstyryl)-benzene-5',5''-disulfonic acid is obtained in the form of yellow crystals. Fluorescence spectrum: $\lambda_{max}$ = 432 millimicrons, measured in dimethylformamide. The disodium salt has the formula:

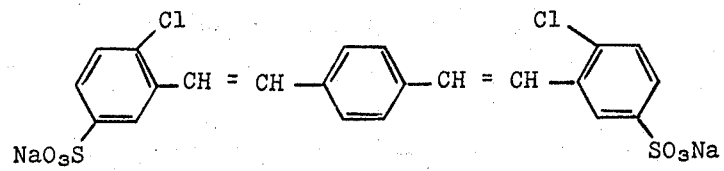

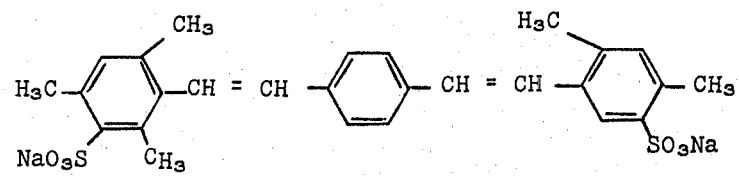

EXAMPLE 9

38 parts of the p-xylylenediphosphonate in Example 1 is replaced by 44 parts of the 2,5-dimethoxy-p-xylylenediphosphonate. After precipitating the crude product from 300 parts of 80% aqueous dimethylformamide and 600 parts of isopropanol, 31.5 parts (55% of the theory) of the disodium salt of 1,4-bis-(4-methylstyryl)-2,5-dimethoxybenzene-5′,5″-disulfonic acid is obtained as a yellow powder. Fluorescence spectrum: $\lambda_{max} = 465$ and 445 millimicrons, measured in dimethylformamide.

The compound has the formula:

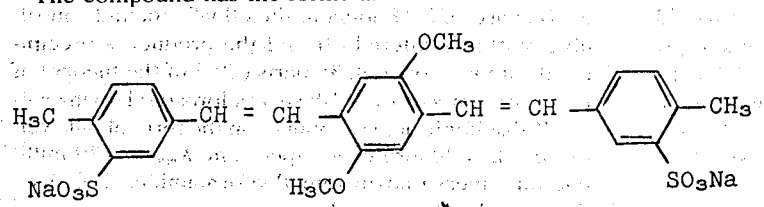

EXAMPLE 10

The 42 parts of p-xylylenediphosphonate in Example 6 is replaced by 48.5 parts of 2,5-dimethoxy-p-xylylenediphosphonate and analogous processing is carried out. 30.5 parts (45% of the theory) of the disodium salt of 1,4-bis-(2-chlorostyryl)-2,5-dimethoxybenzene-5′,5″-disulfonic acid is obtained as a yellow powder. Fluorescence spectrum: $\lambda_{max} = 460$ millimicrons, measured in dimethylformamide. The disodium salt has the formula:

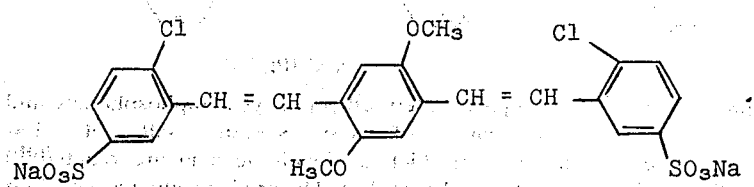

EXAMPLE 11

In Example 3, 76 parts of the p-xylylenediphosphonate is replaced by 88 parts of the 2,5-dimethoxy-p-xylylene-diphosphonate and analogous processing is carried out. 74 parts (49% of the theory) of the tetrasodium salt of 1,4-bis-styryl-2,5-dimethoxybenzene-2′,2‴,4′,4‴-tetrasulfonic acid is obtained as a yellow powder. Fluorescence spectrum: $\lambda_{max} = 475$ and 450 millimicrons, measured in dimethylformamide.

Compounds characterized by their substituents in the following Table and having the general formula:

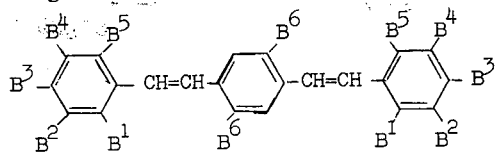

may be prepared in an analogous manner.

M in the Table denotes hydrogen or an alkali metal atom such as sodium (Na) as in the preceding examples.

| $B^1$ | $B^2$ | $B^3$ | $B^4$ | $B^5$ | $B^6$ |
|---|---|---|---|---|---|
| H | $SO_3M$ | $C_2H_5$ | H | H | H |
| H | H | $C(CH_3)_3$ | H | $SO_3M$ | H |
| H | $SO_3M$ | $HC(CH_3)_2$ | H | $CH_3$ | H |
| H | $SO_3M$ | $n-C_8H_{17}$ | H | H | H |
| H | $SO_3M$ | $CH_3$ | H | Cl | H |
| H | $SO_3M$ | $CH_3O$ | H | $CH_3$ | H |
| H | $SO_3M$ | $C_2H_5O$ | H | H | H |
| $CH_3O$ | $SO_3M$ | $CH_3$ | Cl | H | H |
| $n-C_8H_{17}O$ | $SO_3M$ | H | $CH_3$ | H | H |
| $CH_3$ | $SO_3M$ | $CH_3O$ | $C(CH_3)_3$ | H | H |
| $CH_3O$ | $SO_3M$ | H | $n-C_8H_{17}$ | H | H |
| Cl | $SO_3M$ | H | H | Cl | H |
| H | $SO_3M$ | Br | H | H | H |
| $SO_3M$ | H | Cl | H | H | $CH_3O$ |
| Cl | $SO_3M$ | H | H | Cl | $CH_3O$ |
| H | $SO_3M$ | $CH_3$ | H | H | Cl |
| H | H | $C(CH_3)_3$ | H | $SO_3M$ | Cl |
| H | $SO_3$ | $CH(CH_3)_2$ | H | $CH_3$ | Cl |
| H | $SO_3M$ | $CH_3O$ | H | H | Cl |
| H | $SO_3M$ | H | H | Cl | Cl |
| $SO_3M$ | H | $SO_3M$ | H | H | Cl |
| $SO_3M$ | H | H | H | H | $CH_3$ |
| H | $SO_3M$ | $CH_3$ | H | H | $CH_3$ |
| H | $SO_3M$ | $CH_3$ | H | $CH_3$ | $CH_3$ |
| H | $SO_3M$ | $C_2H_5O$ | H | H | $CH_3$ |
| $CH_3O$ | $SO_3M$ | H | $CH_3$ | H | $CH_3$ |
| $n-C_8H_{17}O$ | $SO_3M$ | H | $CH_3$ | H | $CH_3$ |
| $SO_3M$ | H | Cl | H | H | $CH_3$ |
| $CH_3$ | $SO_3M$ | $CH_3O$ | $C(CH_3)_3$ | H | $CH_3$ |

I claim:
1. An optical brightener of the formula

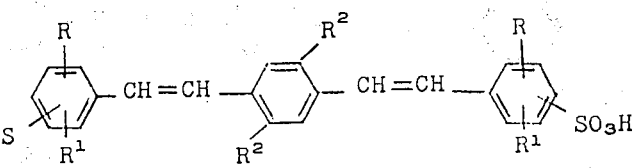

wherein:

R is alkyl of 1 to 4 carbon atoms or chlorine;
$R^1$ is hydrogen or methyl; and
$R^2$ is hydrogen, chlorine or methyl 2. An optical brightener as claimed in claim 1 of the formula

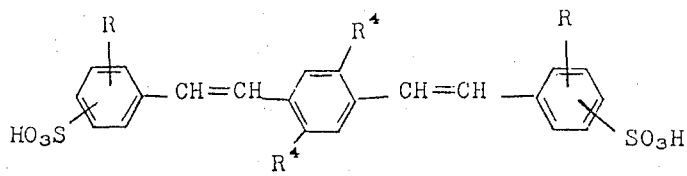
wherein:
R has the same meaning as claim 1; and
R⁴ is hydrogen or methyl.
3. The compound of the formula
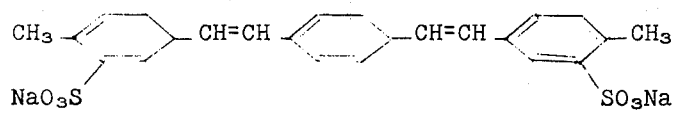
4. The compound of the formula
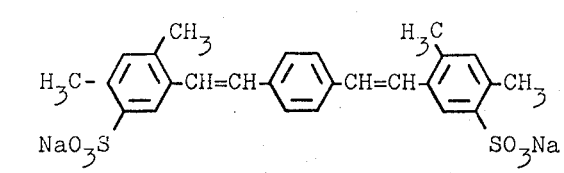
5. The compound of the formula
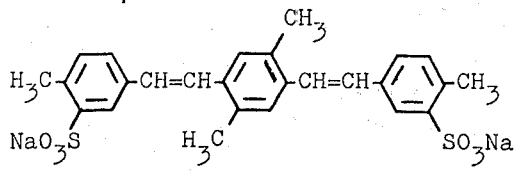
6. The compound of the formula
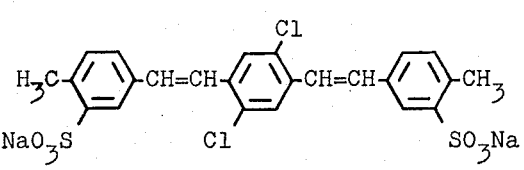
* * * * *